(12) United States Patent
Airoldi

(10) Patent No.: US 11,365,725 B2
(45) Date of Patent: Jun. 21, 2022

(54) COOLING HEAT EXCHANGER FOR A WIND TURBINE

(71) Applicant: Siemens Gamesa Renewable Energy A/S, Brande (DK)

(72) Inventor: Giovanni Airoldi, Veldhoven (NL)

(73) Assignee: SIEMENS GAMESA RENEWABLE ENERGY A/S

( * ) Notice: Subject to any disclaimer, the term of this patent is extended or adjusted under 35 U.S.C. 154(b) by 28 days.

(21) Appl. No.: 16/736,102

(22) Filed: Jan. 7, 2020

(65) Prior Publication Data

US 2020/0224643 A1 Jul. 16, 2020

(30) Foreign Application Priority Data

Jan. 10, 2019 (EP) .................................... 19151213

(51) Int. Cl.
*F03D 80/80* (2016.01)
*F03D 80/60* (2016.01)
*F03D 9/25* (2016.01)

(52) U.S. Cl.
CPC ............. *F03D 80/88* (2016.05); *F03D 80/60* (2016.05); *F03D 9/25* (2016.05); *F05B 2240/14* (2013.01); *F05B 2260/205* (2013.01)

(58) Field of Classification Search
CPC ...... F03D 80/60; F03D 80/88; F05B 2240/14; F05B 2260/205
See application file for complete search history.

(56) References Cited

U.S. PATENT DOCUMENTS

| | | | | |
|---|---|---|---|---|
| 8,047,774 B2 * | 11/2011 | Bagepalli | ............. | H02K 7/1823 |
| | | | | 415/176 |
| 8,632,303 B2 | 1/2014 | Akashi et al. | | |
| 9,039,369 B2 * | 5/2015 | Sivalingam | ............. | F03D 80/60 |
| | | | | 416/95 |
| 9,926,915 B2 * | 3/2018 | Funabashi | ............... | F03D 80/60 |
| 2011/0126544 A1 | 6/2011 | Foster | | |
| 2012/0133152 A1 * | 5/2012 | Wagoner | ................. | F03D 80/60 |
| | | | | 290/1 B |

(Continued)

FOREIGN PATENT DOCUMENTS

| | | |
|---|---|---|
| CN | 202254978 U | 5/2012 |
| CN | 104912750 A | 9/2015 |

(Continued)

OTHER PUBLICATIONS

European Search Report dated Jul. 12, 2019 for Application No. 19151213.6.

*Primary Examiner* — Richard A Edgar
*Assistant Examiner* — Jason G Davis
(74) *Attorney, Agent, or Firm* — Schmeiser, Olsen & Watts LLP

(57) ABSTRACT

Provided is a nacelle for a wind turbine extending along a longitudinal axis and including an outer surface and an heat exchanger on the outer surface, the heat exchanger including a plurality of fluid passages for a fluid to be cooled in the heat exchanger and a plurality of air passages for a cooling air flow in thermal contact with the fluid passages, the air passages extending between an inlet surface and an outlet surface of the heat exchanger. The inlet surface is inclined with respect to the longitudinal axis of an installation angle between 0° and 90°.

5 Claims, 3 Drawing Sheets

(56) References Cited

U.S. PATENT DOCUMENTS

| | | | |
|---|---|---|---|
| 2014/0175802 A1* | 6/2014 | Taniyama | H02K 7/1838 |
| | | | 290/55 |
| 2015/0177741 A1 | 6/2015 | Haller et al. | |
| 2015/0233265 A1 | 8/2015 | Rohden | |
| 2017/0175716 A1 | 6/2017 | Nyvad et al. | |
| 2019/0285059 A1 | 9/2019 | Gao et al. | |

FOREIGN PATENT DOCUMENTS

| | | | |
|---|---|---|---|
| CN | 106014882 A | | 10/2016 |
| CN | 106471248 A | | 3/2017 |
| CN | 206309535 U | | 7/2017 |
| CN | 206490546 U | | 9/2017 |
| CN | 206683460 U | | 11/2017 |
| CN | 108019324 A | | 5/2018 |
| CN | 109139396 A | | 1/2019 |
| CN | 109162880 A | | 1/2019 |
| DE | 102004018758 A1 | | 11/2005 |
| DE | 102012017462 A1 | | 5/2014 |
| EP | 2587052 A1 | | 5/2013 |
| WO | 2014037090 A1 | | 3/2014 |
| WO | 2015019664 A1 | | 2/2015 |

\* cited by examiner

COOLING HEAT EXCHANGER FOR A WIND TURBINE

CROSS-REFERENCE TO RELATED APPLICATIONS

This application claims priority to EP Application No. 19151213.6, having a filing date of Jan. 10, 2019, the entire contents of which are hereby incorporated by reference.

FIELD OF TECHNOLOGY

The following relates to a cooling heat exchanger (cooler) installed on the nacelle of a wind turbine.

BACKGROUND

Wind turbine electrical components are being pushed to their limits as wind turbines are being installed in areas with high ambient temperatures or as the power output is being increased to generate more energy.

Therefore, an ever increasing cooling capacity needs to be provided to avoid excessive temperature to be reached in the generator, the converter and the nacelle. Such requirement is typically met through coolers to be installed on the nacelle roof, wherein a fluid, for example water, is cooled by means of an air flow crossing the cooler. The air flow may be generated by one or more fans provided at one surface of the cooler (active cooling) or may be naturally present (passive cooling).

One way to increasing the cooling capacity of a cooler is achieved by increasing the heat exchange surface of the cooler.

However, there are spatial limitations mostly due to aviation regulation for the helicopter operations: in height the passive cooler cannot exceed the limit of three meters already reached, and an extension in width, with coolers protruding outside the nacelle, would prevent the possibility of exchange of the coolers in case of failure.

Therefore, there is a need to provide a cooler to be installed on a nacelle of a wind turbine, the cooler having an improved cooling capacity with respect to know-in-the-art heat exchangers without exceeding the above defined geometric constraints, as far as the total height and width of the cooler installation is concerned.

SUMMARY

According to embodiments of the invention there is provided a nacelle for a wind turbine extending along a longitudinal axis and comprising:

an outer surface and an heat exchanger on said outer surface, the heat exchanger including a plurality of fluid passages for a fluid to be cooled in the heat exchanger and a plurality of air passages for a cooling air flow in thermal contact with the fluid passages, the air passages extending between an inlet surface and an outlet surface of the heat exchanger, wherein the inlet surface is inclined with respect to the longitudinal axis of an installation angle comprised between 0° and 90°. Advantageously, by inclining the inlet surface the extension of the inlet surface and the numbers of fluid passages and air passages are increased, thus increasing also the cooling capacity of the cooling heat exchanger, without significantly modifying the total height and width of the cooling heat exchanger.

The result of such installation is a lower temperature of the cooling fluid entering generator and converter, allowing higher power production, or utilization of the turbine in higher temperature climates.

As cooling fluid, water or a fluid including water (for example a mixture of water and glycol) may be used.

In embodiments of the present invention, the air passages are aligned with the longitudinal axis. Advantageously, this prevents the fluid channels from partially obstructing the air passages with respect to the wind prevalent direction and from creating an undesired resistance to the cooling air flow.

In other embodiments of the present invention, the heat exchanger comprises at least a fan for generating the cooling air flow. In particular, the fan may be installed at the outlet surface of the cooling heat exchanger. According to such embodiment, the fan is able to provide the necessary pressure difference for the air to flow through the cooling heat exchanger, also independently from the orientation of the air passages. Advantageously, the presence of one or more fans for generating the cooling air flow may be combined with air passages aligned with the longitudinal axis fan.

In embodiments of the present invention, the heat exchanger comprises two cooling modules, the two cooling modules being symmetric to each other with respect to the longitudinal axis. This symmetric configuration may provide a good balance of the aerodynamic forces acting on the heat exchanger.

The aspects defined above and further aspects of embodiments of the present invention are apparent from the examples of embodiment to be described hereinafter and are explained with reference to such examples of embodiment. Embodiments of the invention will be described in more detail hereinafter with reference to examples of embodiment but to which embodiments of the invention are not limited.

BRIEF DESCRIPTION

Some of the embodiments will be described in detail, with reference to the following figures, wherein like designations denote like members, wherein.

DETAILED DESCRIPTION

The drawings are in schematic form. Similar or identical elements are referenced by the same or different reference signs.

Figure 1:
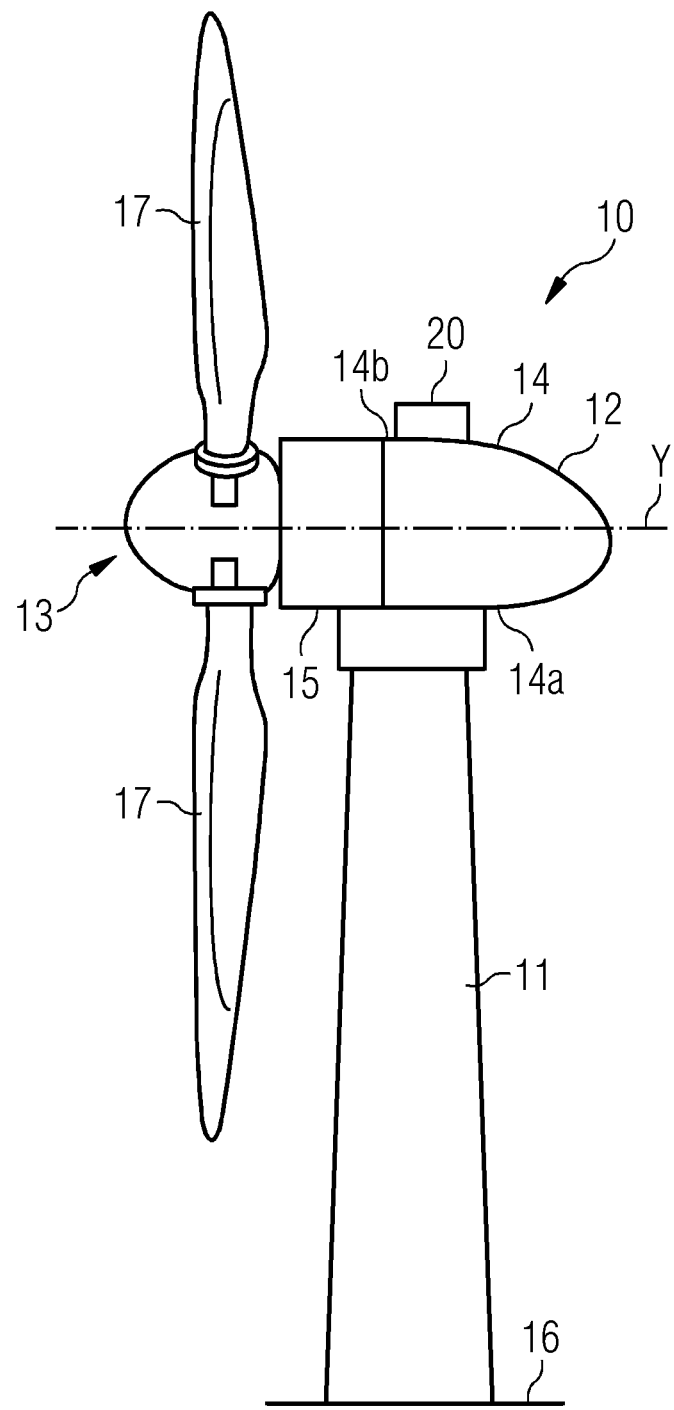
FIG. 1 shows a lateral view of a wind turbine including a nacelle having a cooling heat exchanger according to embodiments of the present invention.

FIG. 1 shows a conventional wind turbine 10 for generating electricity. The wind turbine 10 comprises a tower 11 which is mounted on the ground 16 at one bottom end. At the opposite top end of the tower 11 there is mounted a nacelle 12. The nacelle 12 is usually mounted rotatable with regard to the tower 11, which is referred to as comprising a yaw axis substantially perpendicular to the ground 16. The nacelle 12 usually accommodates the generator 15 of the wind turbine and the gear box (if the wind turbine is a geared wind turbine).

The nacelle 12 comprises an outer surface 14, including a base side 14a adjacent to the top end of the tower 11 and a roof side 14b, opposite to the base side 14a. On the roof side 14b a cooling heat exchanger 20 is provided for cooling a cooling fluid, for example a fluid including water, to be used for cooling the generator 15 and/or a converter (not shown in the attached figures) provided inside the nacelle 12 and connected to the generator 15. More in general, the cooling fluid cooled in the heat exchanger 20 is used to provide a cooling capacity inside the volume defined and delimited by the outer surface 14 of the nacelle 12.

Furthermore, the wind turbine 10 comprises a hub 13 which is rotatably attached to the nacelle 12 for rotating about a rotor axis Y, which is a longitudinal axis Y of the nacelle 12. When not differently specified, the terms axial, radial and circumferential in the following are made with reference to the longitudinal rotor axis Y.

The rotor axis Y defines also a prevalent direction of the wind flowing close to the outer surface 14 of the nacelle 12, i.e. also through the heat exchanger 20.

The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 17 (in the embodiment of FIG. 1, the wind rotor comprises three blades 17, of which only two blades 17 are visible) mounted on the hub 13. The blades 17 extend substantially radially with respect to the rotational axis Y.

Figure 2:
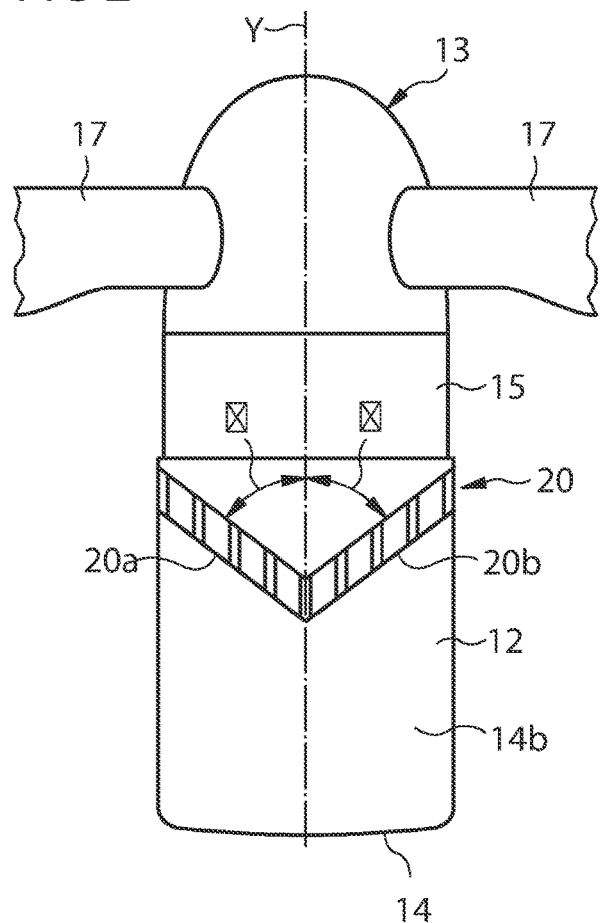
FIG. 2 shows a top view of a nacelle having a cooling heat exchanger according to embodiments of the present invention.

FIGS. 2 and 3 respectively show a top view of the nacelle 14 showing the roof side 14b, on which the heat exchanger 20 is provided, and a top view of the heat exchanger 20.

The heat exchanger 20 includes a plurality of fluid passages 21 for the cooling fluid. The fluid passages are oriented substantially orthogonally to the longitudinal rotor axis Y and parallel to the yaw axis of the tower 11.

The heat exchanger 20 further includes a plurality of air passages 22 for a cooling air flow in thermal contact with the fluid passages 21, the air passages 22 extending between an inlet surface 23 and an outlet surface 24 of the heat exchanger 20.

Fluid passages 21 are substantially orthogonal to the air passages 22.

Figure 3A:
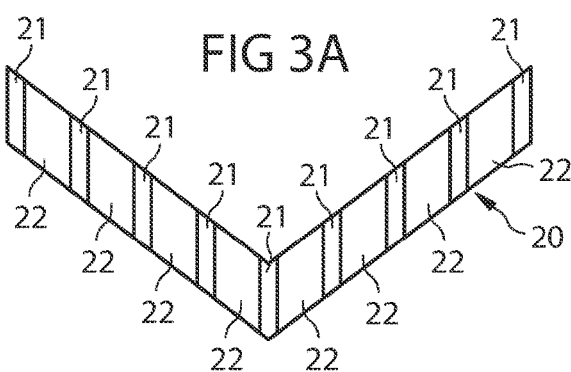
FIG. 3A shows a top view of a cooling heat exchanger according to embodiments of the present invention.
Figure 3B:
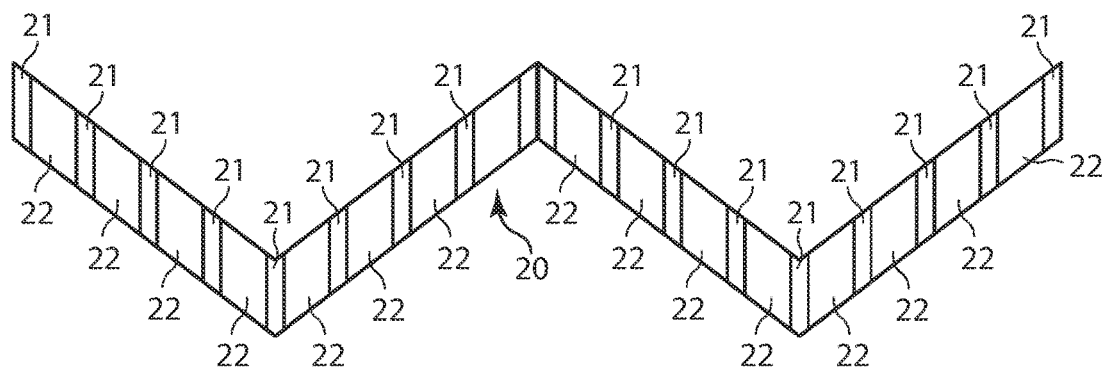
FIG. 3B shows a top view of a cooling heat exchange according to other embodiments of the present invention.

In the embodiment of FIGS. 2, 3A and 3B, the air passages 22 are aligned with the longitudinal axis Y.

The inlet surface 23 is inclined with respect to the longitudinal rotor axis Y of an installation angle α comprised between 0° and 90°.

In the embodiment of FIGS. 2 and 3A, the heat exchanger 20 comprises two cooling modules 20a, 20b, the two cooling modules 20a, 20b being identical and symmetric to each other with respect to a plane including the longitudinal rotor axis Y. In particular, the symmetry plane is a vertical plane. In other words, in these embodiments, the heat exchanger 20 comprises two cooling modules 20a, 20b arranged in a "V" configuration, symmetrical with respect to the longitudinal rotor axis Y.

According to other embodiments such as the embodiment shown in FIG. 3B of the present invention, the heat exchanger 20 comprises more than two cooling modules, for example four modules arranged according to a "W" configuration.

Figure 4:
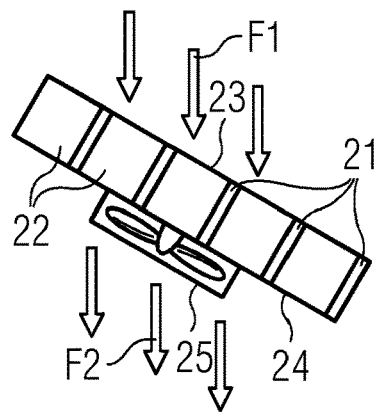
FIG. 4 shows a partial top view of another embodiment of a cooling heat exchanger according to embodiments of the present invention.

FIG. 4 shows another possible embodiment of the heat exchanger 20 of the present invention, the air passages 22 are not aligned with the longitudinal axis Y, but are orthogonal to the inlet surface 23. In such embodiment, differently form the embodiment of FIGS. 2 and 3, the heat exchanger 20 comprises one or more fan 25 provided at the outlet surface 24 for generating the cooling air flow through the air passages 22.

Figure 5:
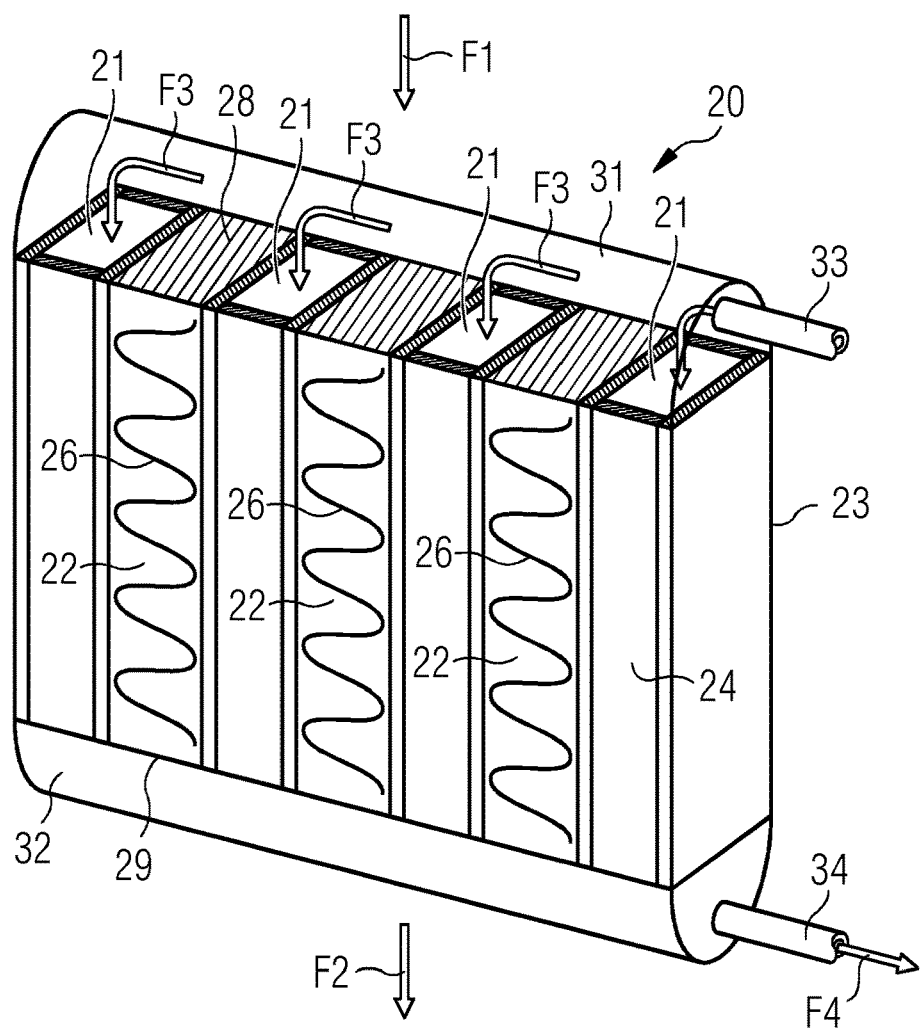
FIG. 5 shows an axonometric view of a cooling heat exchanger of embodiments of the present invention.

FIG. 5 shows a detailed view of the heat exchanger 20 of FIG. 4 (the fan 25 is not visible in FIG. 5). The heat exchanger 20 has a parallelepiped shape with two main surfaces corresponding to the inlet surface 23 and the outlet surface 24, which are parallel to each other.

In the heat exchanger 20 the two pluralities of fluid passages 21 and air passages 22 are alternated to each other, i.e. each air passage 22 is interposed between two fluid passages 21.

The air passages 22 extend between the inlet surface 23 and the outlet surface 24 and are perpendicular to the inlet surface 23 and the outlet surface 24. To improve the heat exchange between the heat exchanger 20 and the cooling air flow a plurality of respective corrugated fins 26 are provided inside the air passages 22. In this embodiment, the air passages 22 are inclined with respect to the air flow which enters the heat exchanger 20 through the inlet surface 23 (according to the direction F1 of FIG. 5) and which exits the heat exchanger 20 through the outlet surface 24 (according to the direction F2 of FIG. 5). The directions F1, F2 are parallel to the longitudinal rotor axis Y and therefore to the wind prevalent direction. Inside the air passages 22 the air flow is deviated with respect to such directions.

The fluid passages 21 extend orthogonally to the air passages 22 between a top surface 28 and a bottom surface 29 of the heat exchanger 20. On the top surface 28 a first manifold 31 is provided. The first manifold 31 receives a flow of fluid to be cooled from the inside of the nacelle 12 through a fluid inlet 33 of the first manifold 31 and delivers such fluid to the fluid passages 21 (as symbolized by the arrows F3 of FIG. 5). The fluid is cooled by flowing in the fluid passages 21 and transferring heat to the air flow in the air passages 22. The cooled fluid is collected downstream the fluid passages 21 in a second manifold 22, provided at the bottom surface 29 of the heat exchanger 20. The second manifold 32 delivers the cooled fluid to an inside of the nacelle 12, for example for cooling the electric generator 15 and/or the converter, through a fluid outlet 34 (as symbolized by the arrow F4 of FIG. 5) of the second manifold 32.

According to the embodiment of FIGS. 2 and 3, the heat exchanger 20 of FIG. 5 could be modified by orienting the air passages 22, and consequently the fluid passages 21, parallel the directions F1, F2 of FIG. 5 and therefore to the wind prevalent direction, in such a way that the air flow inside the air passages 22 is not deviated with respect to such directions. Accordingly, in such embodiment a fan is not required for providing the necessary pressure difference for the air flow through air passages 22, but a fan can be nevertheless installed for improving the cooling capacity.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A nacelle for a wind turbine extending along a longitudinal axis, the nacelle rotatably mountable to a tower having a yaw axis, and comprising:
   an outer surface and a heat exchanger on the outer surface, the heat exchanger including a plurality of fluid passages for a fluid to be cooled in the heat exchanger, the fluid passages being oriented orthogonal to the longitudinal axis and parallel to the yaw axis, and a plurality of air passages for a cooling air flow in thermal contact with the fluid passages, the air passages extending between an inlet surface and an outlet surface of the heat exchanger, and the air passages being oriented orthogonal to the fluid passages,
   wherein the inlet surface is arranged at an angle greater than 0° and less than 90° with respect to the longitudinal axis, and
   wherein the heat exchanger comprises four cooling modules and the four cooling modules are arranged in a W configuration.

2. The nacelle according to claim 1, wherein the air passages are aligned with the longitudinal axis.

3. The nacelle according to claim 1, wherein the heat exchanger comprises at least a fan for generating the cooling air flow.

4. The nacelle according to claim 1, wherein the outlet surface is parallel to the inlet surface.

5. A wind turbine comprising:
   a nacelle,
   a wind turbine rotor having a hub and a blade, the wind turbine rotor being rotatably attached to the nacelle for rotating about a longitudinal axis of the nacelle,
   an outer surface of the nacelle,
   a heat exchanger on the outer surface of the nacelle, wherein the heat exchanger includes a plurality of fluid passages for a fluid to be cooled in the heat exchanger and a plurality of air passages for a cooling air flow in thermal contact with the plurality of fluid passages, wherein the plurality of fluid passages are oriented orthogonal to the longitudinal axis of the nacelle and parallel to a yaw axis of the wind turbine, wherein the plurality of air passages extend between an inlet surface and an outlet surface of the heat exchanger, and wherein the plurality of air passages are oriented orthogonal to the fluid passages,
   wherein the inlet surface is arranged at an angle greater than 0° and less than 90° with respect to the longitudinal axis of the nacelle, and
   wherein the heat exchanger comprises four cooling modules and the four cooling modules are arranged in a W configuration.

* * * * *